United States Patent
Lee (10) Patent No.: US 11,274,719 B2
(45) Date of Patent: Mar. 15, 2022

(54) PUMPING DEVICE FOR SEAT OF VEHICLE

(71) Applicant: HYUNDAI TRANSYS INCORPORATED, Seosan-si (KR)

(72) Inventor: Young Sun Lee, Hwaseong-si (KR)

(73) Assignee: HYUNDAI TRANSYS INCORPORATED, Seosan-si (KR)

( * ) Notice: Subject to any disclaimer, the term of this patent is extended or adjusted under 35 U.S.C. 154(b) by 0 days.

(21) Appl. No.: 16/983,551

(22) Filed: Aug. 3, 2020

(65) Prior Publication Data

US 2021/0123491 A1 Apr. 29, 2021

(30) Foreign Application Priority Data

Oct. 29, 2019 (KR) .................. 10-2019-0135213

(51) Int. Cl.
| | | |
|---|---|---|
| *F16D 67/02* | (2006.01) | |
| *F16D 11/14* | (2006.01) | |
| *F16D 49/00* | (2006.01) | |
| *B60N 2/90* | (2018.01) | |
| *B60N 2/16* | (2006.01) | |
| *F16D 121/14* | (2012.01) | |

(52) U.S. Cl.
CPC ............ *F16D 67/02* (2013.01); *B60N 2/168* (2013.01); *B60N 2/1635* (2013.01); *B60N 2/919* (2018.02); *F16D 11/14* (2013.01); *F16D 49/00* (2013.01); *F16D 2121/14* (2013.01)

(58) Field of Classification Search
CPC .......................... B60N 2/16–168; F16D 67/02
See application file for complete search history.

(56) References Cited

U.S. PATENT DOCUMENTS

| | | | | |
|---|---|---|---|---|
| 4,919,243 A | * | 4/1990 | Flotow ...................... | B22F 7/06 192/107 M |
| 8,678,154 B2 | * | 3/2014 | Kim ........................ | B60N 2/167 192/38 |
| 2009/0184554 A1 | * | 7/2009 | Paing ...................... | B60N 2/168 297/358 |
| 2015/0158398 A1 | * | 6/2015 | Kim ........................ | B60N 2/938 297/344.12 |
| 2015/0314709 A1 | * | 11/2015 | Kim ...................... | B60N 2/1864 297/344.12 |
| 2017/0253149 A1 | * | 9/2017 | Chae ........................ | B60N 2/168 |
| 2018/0001794 A1 | * | 1/2018 | Kim ...................... | B60N 2/1635 |

FOREIGN PATENT DOCUMENTS

| | | |
|---|---|---|
| KR | 10-1294382 B1 | 8/2013 |
| KR | 10-2018-0107722 A | 10/2018 |
| KR | 10-1987977 B1 | 6/2019 |
| KR | 10-2019-0078358 A | 7/2019 |

* cited by examiner

*Primary Examiner* — Ernesto A Suarez
*Assistant Examiner* — Lillian T Nguyen
(74) *Attorney, Agent, or Firm* — Novick, Kim & Lee, PLLC; Jae Youn Kim; Jihun Kim (57) ABSTRACT

A pumping device for a seat of a vehicle is proposed. In the pumping device, a plurality of pressure members is provided along an outer circumferential surface of a brake drum, and braking operation is performed through the pressure members moved when the brake drum rotates, so that friction between the brake drum and a housing can be avoided and thus deterioration of operational performance is prevented. In addition, the shape of the brake drum is simplified and the number of components is reduced, so that weight and size of the pumping device, and production cost are reduced, and fuel efficiency increases.

7 Claims, 8 Drawing Sheets

PUMPING DEVICE FOR SEAT OF VEHICLE

CROSS REFERENCE TO RELATED APPLICATION

The present application claims priority to Korean Patent Application No. 10-2019-0135213, filed Oct. 29, 2019, the entire contents of which is incorporated herein for all purposes by this reference.

BACKGROUND OF THE INVENTION

Field of the Invention

The present disclosure relates generally to a pumping device for a seat of a vehicle, wherein the pumping device is configured to minimize interference between components so as to prevent deterioration of operating force due to friction between the components and to simplify configuration so as to reduce production cost.

Description of the Related Art

Generally, seats such as a driver's seat and passenger seats provided in the front and back areas of a cabin of a vehicle are provided with various convenience devices for passenger comfort.

As the convenience devices, a seat of a vehicle has functions such as a sliding function that can adjust a position of a seat by pushing and pulling forward and backward the seat according to a body shape of a passenger, and a reclining function that can adjust inclination of a seat back.

Further, in recent years, a pumping device, which has a seat lifting function, has been provided in a vehicle to adjust the height of the seat to fit to the height of a passenger.

The pumping device can include a lever unit, a clutch unit, and a brake unit. The lever unit receives a user's operating force and transmits the operating force to the clutch unit, the clutch unit transmits the input operating force to a link means of a seat, and the brake unit blocks a reversely input power to fix the locked link means.

The lever unit includes a lever bracket, which converts a vertical operating force of a handle lever provided at a side of a seat into a rotational force and transmits the rotational force to the clutch unit. Further, the pumping device may include a return part for returning the handle lever and the lever bracket to initial positions.

However, conventionally, the clutch unit has a T shaped protrusion to operate a brake roller, and at this point, as the protrusion of the clutch unit is brought into contact with a housing intermittently, there is a problem in that operating force is reduced and difference feeling during operation occurs.

Further, as a pair of elastomers are provided on opposite sides of the T shaped protrusion, the number of components increases and manufacturing cost increases.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and the present disclosure is intended to propose a pumping device for a seat of a vehicle, wherein interference between components is minimized to prevent deterioration of operating force due to friction between the components, and configuration thereof is simplified to reduce production cost.

In order to achieve the above objectives, according to one aspect of the present disclosure, there is provided a pumping device for a seat of a vehicle, and the pumping device includes: a clutch drum rotated in conjunction with rotation of a lever bracket, and comprising a plurality of clutch protrusions that are spaced apart from each other along an edge of the clutch drum; a brake drum provided to allow the plurality of clutch protrusions to be arranged at an outer circumferential surface thereof, and comprising a plurality of support protrusions that protrude outward along the outer circumferential surface of the brake drum while being spaced apart from the clutch protrusions; a plurality of brake rollers provided between the clutch protrusions and the support protrusions; and a plurality of pressure members provided by being spaced apart from each other along the outer circumferential surface of the brake drum while being arranged in contact with the support protrusions, wherein when the brake drum is rotated, the pressure members may be moved together with the support protrusions to be moved in conjunction with the brake rollers.

The pumping device may include: a housing having a receiving space in which the clutch drum and the brake drum assembled with each other may be received; and a cover coupled to the housing and provided for seating the clutch drum and the brake drum received in the receiving space.

The brake drum may have a low-friction part at a portion facing the cover, and the cover may have a low-friction counterpart at a portion facing the brake drum, the low-friction counterpart matching with the low-friction part.

One of the low-friction part and the low-friction counterpart may be configured to extend in a ring shape, and a remaining one of the low-friction part and the low-friction counterpart may have a plurality of parts that may be spaced apart from each other along an extending direction of the ring shape.

The support protrusions may be configured to extend along an edge of the brake drum between the brake rollers, and each of the pressure members may be configured to extend in a bending shape along an extending direction of each of the support protrusions.

A length of an inner end of each of the pressure members, the inner end contacting with the support protrusion, may be shorter than a length of an opposite outer end thereof.

Each of the support protrusions may have a locking protrusion protruding outward, and each of the pressure members may have an insertion groove, in which the locking protrusion may be inserted, at an inner end of each of the pressure members, the inner end contacting with the support protrusion.

Each of the support protrusions may have a plurality of friction protrusions at an outer circumferential surface thereof, and each of the pressure members may have a plurality of counter-protrusions, which may be in contact with the friction protrusions, at an inner end of the pressure member which may be in contact with the support protrusion.

As described above, the pumping device for a seat of a vehicle has the plurality of pressure members along the outer circumferential surface of the brake drum, and is configured to perform a braking operation through the pressure members moved when the brake drum rotates, so that friction between the brake drum and the housing can be avoided to prevent deterioration of the operational performance. Further, the shape of the brake drum is simplified and the number of components is reduced, so that weight and size of the pumping device can be reduced to reduce production cost and to increase fuel efficiency.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Hereinbelow, a pumping device for a seat of a vehicle according to an exemplary embodiment of the present disclosure will be described with reference to the accompanying drawings.

Figure 1:
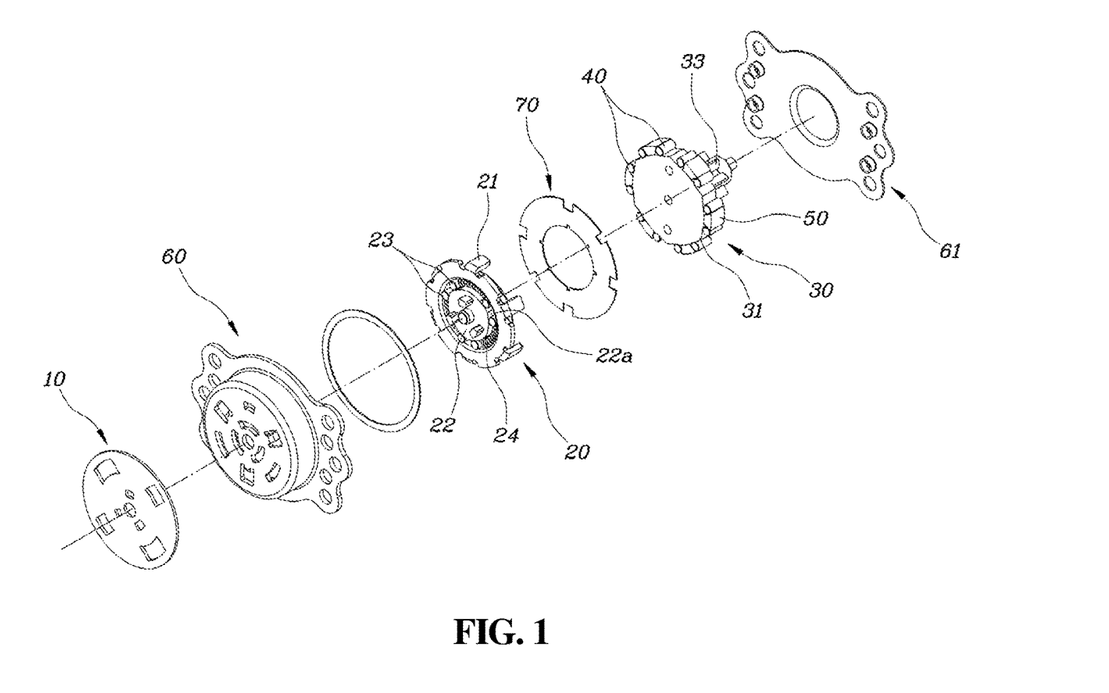
FIG. 1 is an assembly view showing a pumping device for a seat of a vehicle according to the present disclosure.
Figure 2:
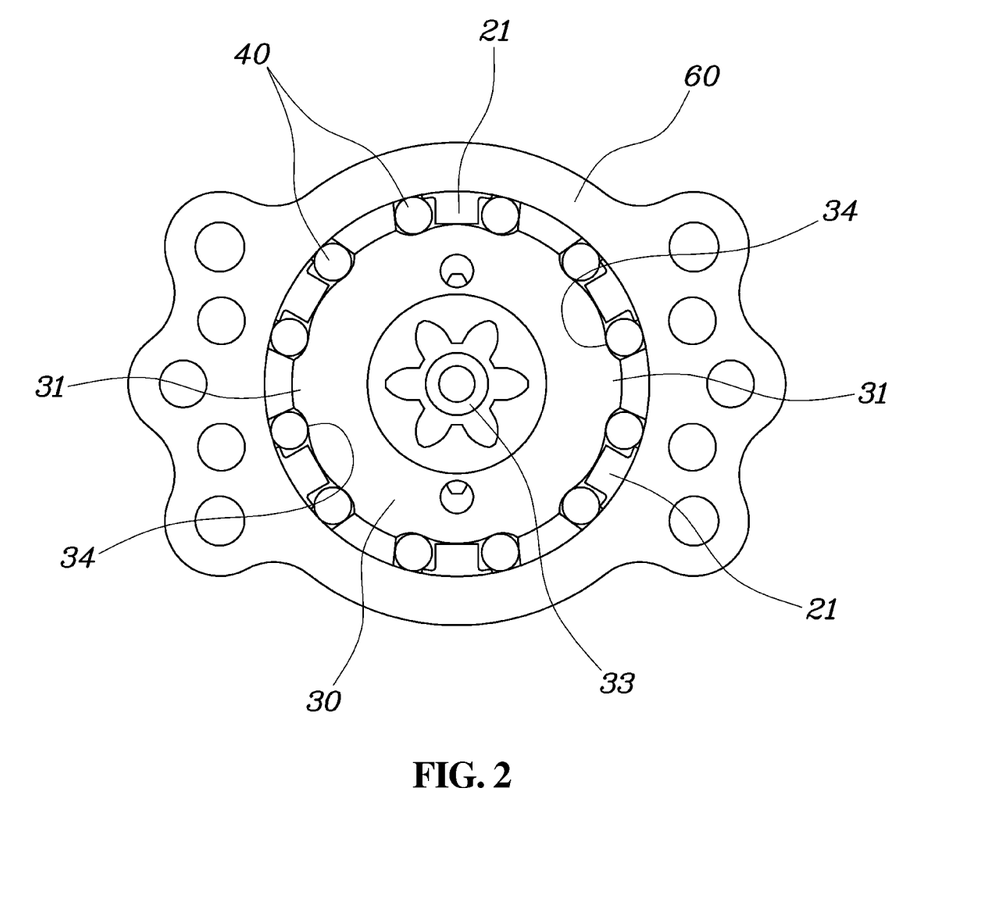
FIG. 2 is a view showing the pumping device for a seat of a vehicle shown in FIG. 1.
Figure 3:
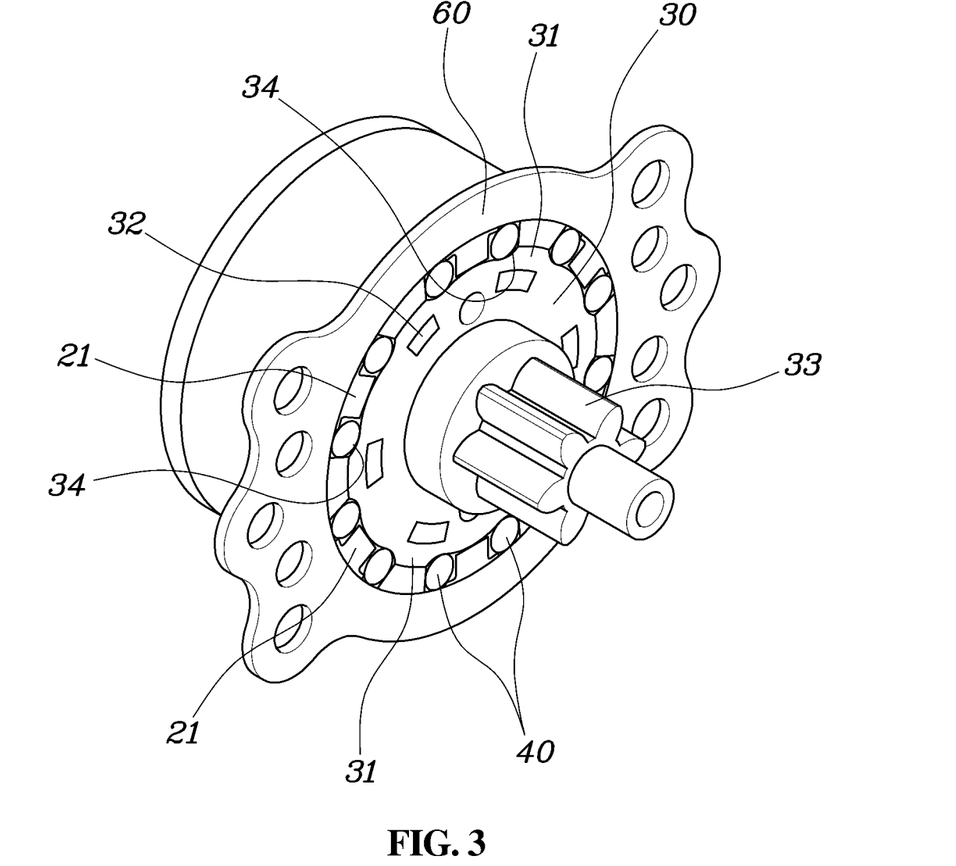
FIGS. 3 and 4 are views showing a low-friction part and a low-friction counterpart of a brake drum and a cover according to the pumping device for a seat of a vehicle shown in FIG. 1.
Figure 4:
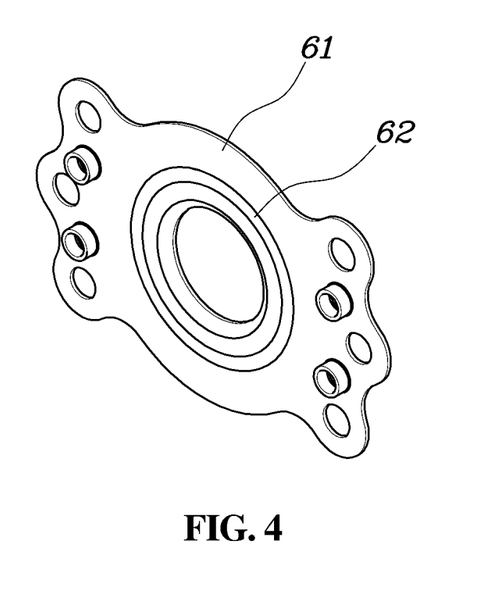
Figure 5:
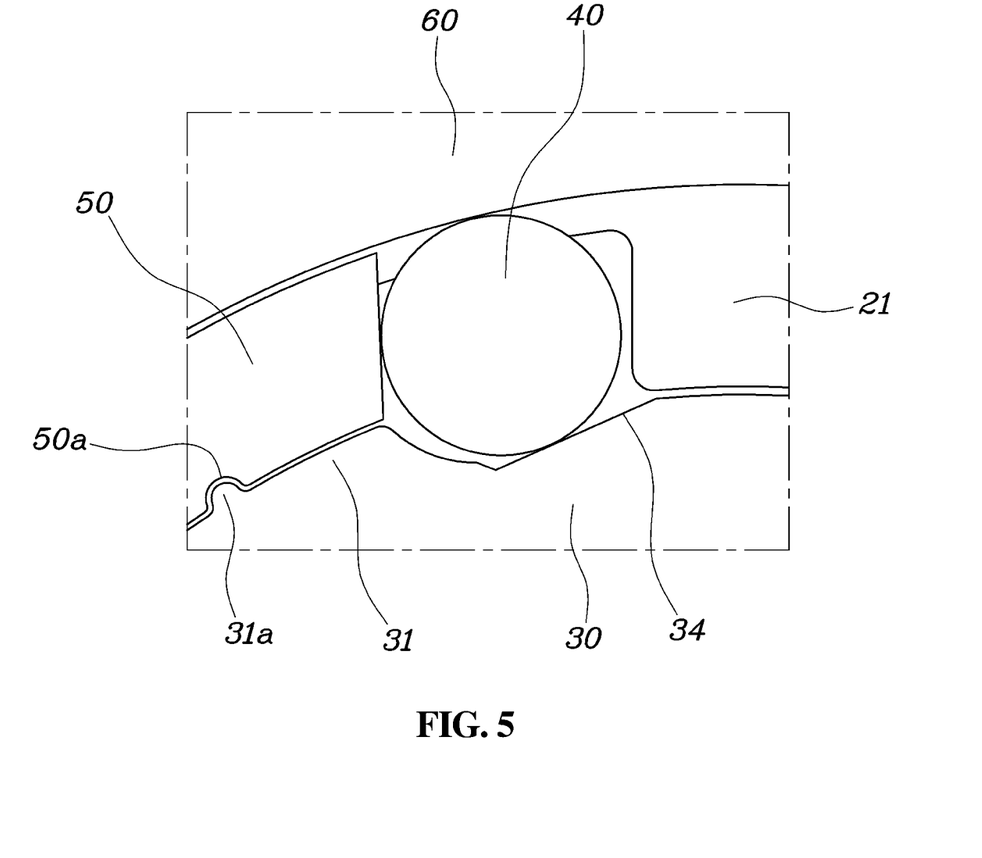
FIG. 5 is a view showing a first embodiment of a pressure member of the pumping device for a seat of a vehicle shown in FIG. 1.
Figure 6:
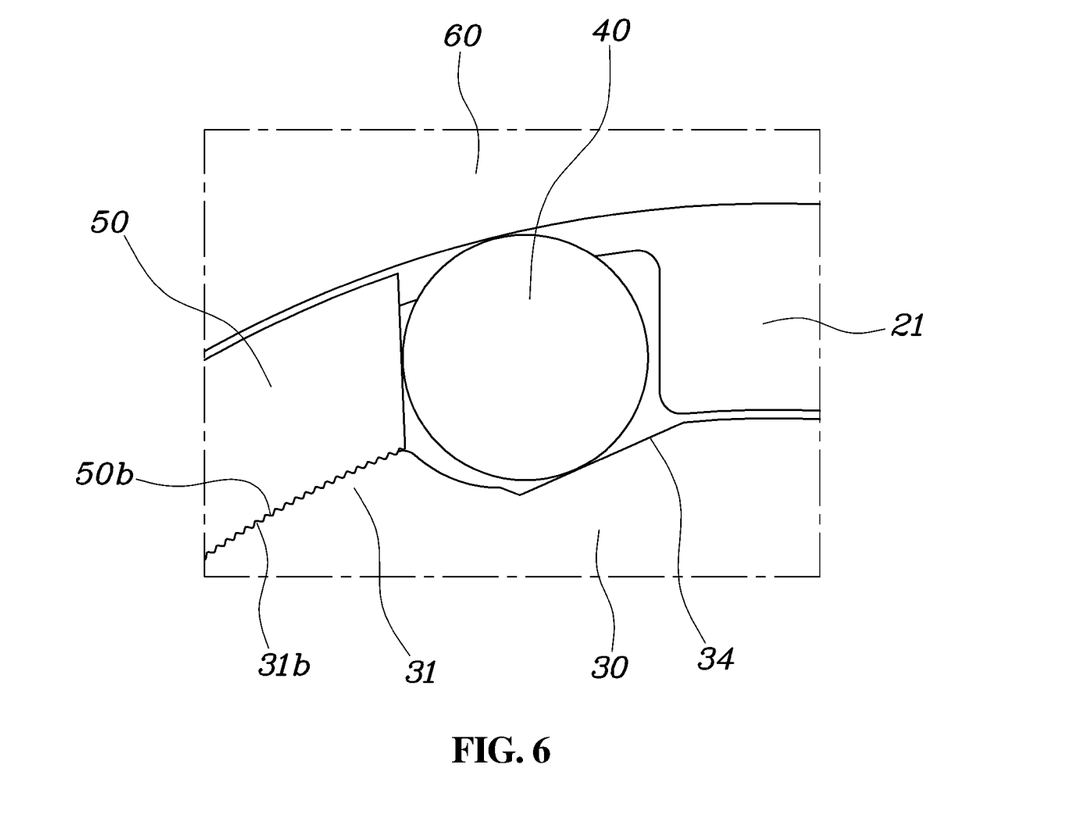
FIG. 6 is a view showing a second embodiment of the pressure member of the pumping device for a seat of a vehicle shown in FIG. 1.
Figure 7:
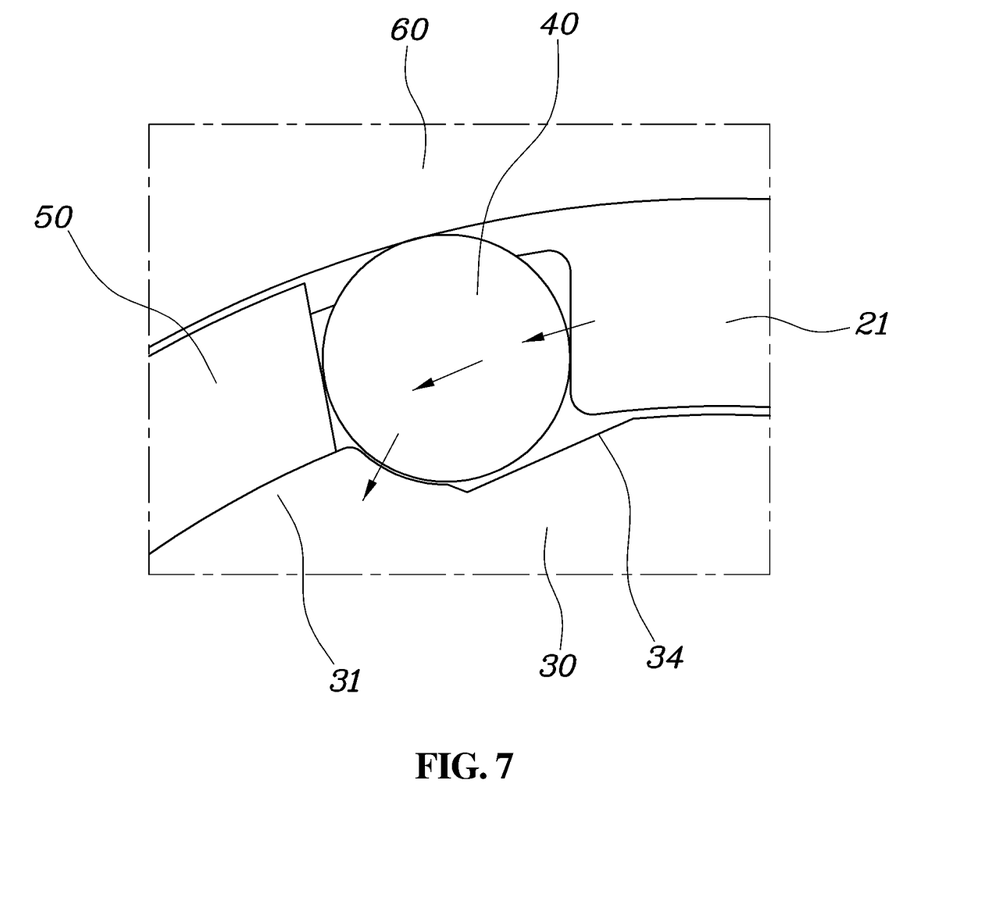
FIGS. 7 and 8 are views showing operation of the pumping device for a seat of a vehicle shown in FIG. 1.
Figure 8:
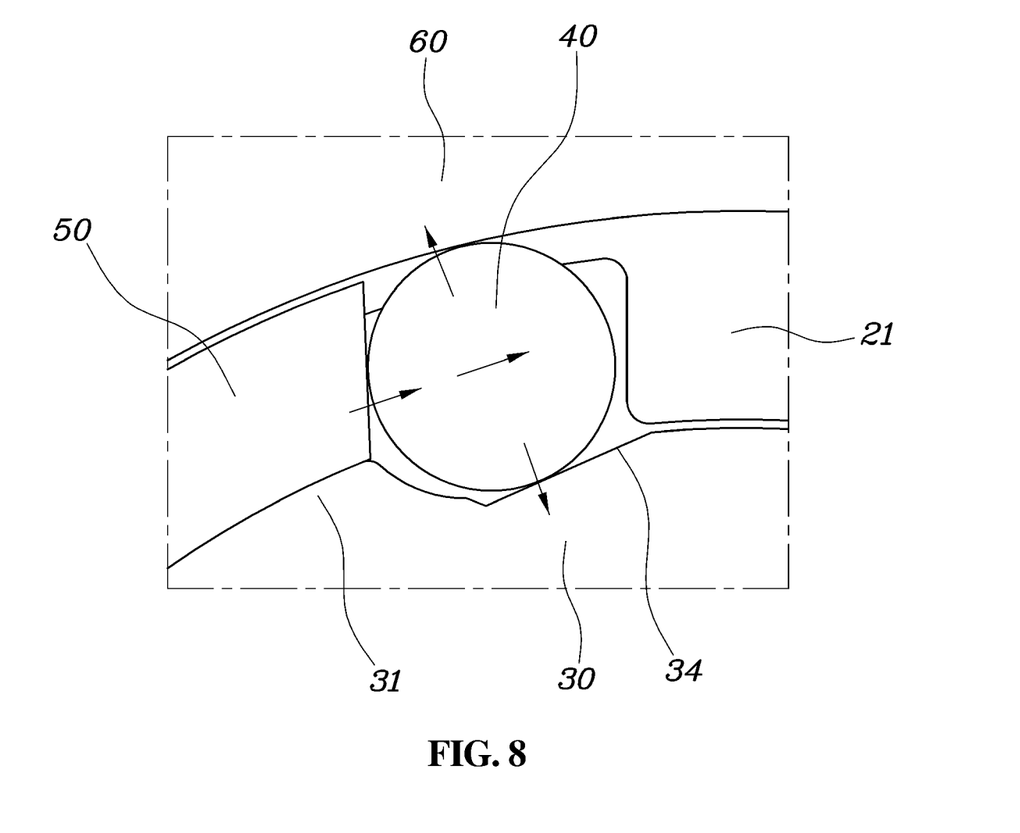

FIG. 1 is an assembly view showing a pumping device for a seat of a vehicle according to the present disclosure. FIG. 2 is a view showing the pumping device for a seat of a vehicle shown in FIG. 1. FIGS. 3 and 4 are views showing a low-friction part and a low-friction counterpart of a brake drum and a cover according to the pumping device for a seat of a vehicle shown in FIG. 1. FIG. 5 is a view showing a first embodiment of a pressure member of the pumping device for a seat of a vehicle shown in FIG. 1. FIG. 6 is a view showing a second embodiment of the pressure member of the pumping device for a seat of a vehicle shown in FIG. 1. FIGS. 7 and 8 are views showing operation of the pumping device for a seat of a vehicle shown in FIG. 1.

As shown in FIGS. 1 and 2, the pumping device for a seat of a vehicle according to the present disclosure includes: a clutch drum 20 rotating in conjunction with rotation of a lever bracket 10 and having a plurality of clutch protrusions 21 that are spaced apart from each other along an edge of the clutch drum 20; a brake drum 30 provided to allow the plurality of clutch protrusions 21 to be arranged at an outer circumferential surface thereof, and having a plurality of support protrusions 31 that protrude outward along the outer circumferential surface of the brake drum while being spaced apart from the clutch protrusions 21; a plurality of brake rollers 40 provided between the clutch protrusions 21 and the support protrusions 31; and a plurality of pressure members 50 provided by being spaced from each other along the outer circumferential surface of the brake drum 30 while being arranged in contact with the support protrusions 31, wherein when the brake drum 30 rotates, the pressure members 50 are moved together with the support protrusions 31 to be moved in conjunction with the brake roller 40.

Herein, the clutch drum 20, the brake drum 30, the brake rollers 40, and the pressure members 50 are configured to be built in a housing 60, and a cam support 70 may be provided between the clutch drum 20 and the brake drum 30.

The lever bracket 10 is integrally coupled to a lever handle (now shown) operated by a user and is coupled to a clutch cam 22 built in the clutch drum 20, so that when the user manipulates the lever handle, the lever bracket 10 rotates together with the lever handle.

The clutch drum 20 includes the clutch cam 22 having a plurality of wedge protrusions 22a, clutch rollers 23 provided at an outer circumferential surface of the clutch cam 22, and clutch springs 24 elastically supporting the clutch rollers 23 in a circumferential direction. Whereby, the clutch drum 20 transmits an operating force in response to rotation of the lever bracket 10 or provides an elastic restoring force to the lever bracket 10. Further, the clutch drum 20 is configured to be moved in conjunction with the brake drum 30 by having the plurality of clutch protrusions 21 spaced apart from each other along the edge of the clutch drum 20.

The brake drum 30 is provided to allow the plurality of clutch protrusions 21 to be arranged at an outer circumferential surface of the brake drum 30. The brake drum 30 has the plurality of support protrusions 31 that protrude outward while being spaced apart from the clutch protrusions 21 along the outer circumferential surface of the brake drum 30. Further, each of the support protrusions 31 is provided to be in contact with each of the pressure members 50, thus when the brake drum 30 rotates, the pressure member 50 which is in contact with the support protrusion 31 is moved. At this point, the pressure members 50 may be made of elastomer, and may be configured to rotate together with the support protrusions 31 of the brake drum 30 while being in contact with the support protrusions 31.

Accordingly, in the conventional brake drum in which a protrusion moved in conjunction with the brake roller extends in a T shape, the problem caused by the T shaped protrusion contacting with the housing is solved. Both the brake drum and the housing are made of a rigid body. When the T shaped protrusion of the brake drum is brought into contact with the housing, due to friction, operational performance is lowered and, in the worst case, components are damaged.

Therefore, since the support protrusions 31 of the brake drum protrude to be spaced from the housing 60 and the support protrusions 31 rotate together with the pressure members 50 while being in contact with the pressure members 50, brake function remains, but the problem caused by interference between each component is solved. In addition, conventionally, as the protrusion of the brake drum is formed in the T shape, elastomers should be provided at opposite sides of the T shape, respectively. However, in the present disclosure, as each of the pressure members 50 is provided for each protrusion, the number of components is reduced and the structure is simplified.

An output shaft 33 is integrally coupled to the brake drum 30 and the brake rollers 40 are provided at opposite sides of each of the support protrusions 31. Thereby, the brake drum 30 blocks a torque reversely input through the output shaft 33 and maintains the adjusted height of the seat.

The brake drum 30 and the clutch drum 20 are built in the housing 60. As shown in FIGS. 3 and 4, the pumping device for a seat of a vehicle includes: the housing 60 having a receiving space in which the clutch drum 20 and the brake drum 30 assembled with each other are received; and a cover 61 coupled to the housing 60 and provided for seating the clutch drum 20 and the brake drum 30 received in the receiving space, thus the clutch drum 20 and the brake drum 30 are moved in conjunction with each other in the housing 60.

The housing 60 and the cover 61 may be coupled to each other through separate bolting fastening. The housing 60 is configured so that the lever bracket 10 passes therethrough and then is connected to the clutch cam 22, and the cover 61 may be configured so that the output shaft 33 of the brake drum 30 passes therethrough to be exposed outward.

The brake drum 30 may have a low-friction part 32 at a portion facing the cover 61 and the cover 61 may have a low-friction counterpart 62 matching with the low-friction part 32 at a portion facing the brake drum 30. That is, the clutch drum 20 and the brake drum 30 that are received in the housing 60 are configured to rotate, thus a contact occurs between the brake drum 30 and the cover 61 as the housing 60 is closed by the cover 61. At this point, the frictional force between the brake drum 30 and the cover 61 may increase, and thus the operating sensitivity may decrease, so that, to overcome this problem, the low-friction part 32 and the low-friction counterpart 62 are respectively provided at the portions where the brake drum 30 and the cover 61 face each other. The low-friction part 32 and the low-friction counterpart 62 may be formed of low-friction coating. As the low-friction part 32 and the low-friction counterpart 62 are brought into contact with each other rather than directly rubbing between the brake drum 30 and the cover 61, the operating sensitivity is improved by a smooth operation due to a reduction in frictional force.

In addition, one of the low-friction part 32 and the low-friction counterpart 62 is formed to extend in a ring shape, and the other one of the low-friction part 32 and the low-friction counterpart 62 is configured as a plurality of parts that are spaced apart from each other along an extending direction of the ring shape. Accordingly, as contact areas between the low-friction part 32 and the low-friction counterpart 62 are reduced, reduction in frictional force may be additionally secured and manufacturing cost may be reduced.

Meanwhile, the support protrusions 31 may be formed to extend along an edge of the brake drum 30 between the brake rollers 40, and each of the pressure members 50 may be formed to extend in a bending shape along an extending direction of each of the support protrusions 31.

Thereby, contact areas between the support protrusions 31 and the pressure members 50 increase, so that the pressure members 50 may rotate smoothly together with the support protrusions 31 when the brake drum 30 rotates. In addition, as each of the pressure members 50 has a shape of extending along the edge of the brake drum 30 together with each of the support protrusions 31, when the clutch drum 20 rotates, connected movement between the pressure members 50 and the brake rollers 40 may be performed smoothly.

A length of an inner end of each of the pressure members 50, the inner end contacting with the support protrusion 31 may be shorter than a length of an opposite outer end thereof. Therefore, the pressure member 50 may be formed in a trapezoidal shape. Further, as the inner end length is shorter than the outer end length, operation relations in which the brake rollers 40 are operated in conjunction with rotation of the brake drum 30 or the pressure members 50 and the brake drum 30 rotate together by operation of the brake roller 40s may be performed smoothly. In addition, a size of each of the pressure members 50 is reduced, thereby reducing weight of the pumping device and manufacturing cost.

In the present disclosure, the pressure members 50 in contact with the support protrusions 31 should be moved together with the support protrusions 31 when the brake drum 30 rotates. To this end, contact states between the pressure members 50 and the support protrusions 31 may be maintained through various embodiments as follows.

As a first embodiment, as shown in FIG. 5, each of the support protrusions 31 has a locking protrusion 31a protruding outward, and each of the pressure members 50 may have an insertion groove 50a in which the locking protrusion 31a is inserted at the inner end contacting with each of the support protrusions 31. As described above, since each of the support protrusions 31 has the locking protrusion 31a and each of the pressure members 50 has the insertion groove 50a in which the locking protrusion 31a is inserted, the pressure members 50 may be moved together with the support protrusions 31 through the insertion connecting structure between the locking protrusion 31a and the insertion groove 50a. Herein, positions of the locking protrusion 31a and the insertion groove 50a may be arranged oppositely. As each of the pressure members 50 is firmly fixed to each of the support protrusions 31 through the insertion connecting structure between the locking protrusion 31a and the insertion groove 50a, braking and releasing operations in response to rotation of the brake drum 30 may be performed smoothly.

As a second embodiment, as shown in FIG. 6, each of the support protrusions 31 has a plurality of friction protrusions 31b at an outer circumferential surface thereof, and each of the pressure members 50 may have a plurality of counter-protrusions 50b contacting with the friction protrusions 31b, at the inner end contacting with the support protrusion 31.

The friction protrusions 31b and the counter-protrusions 50b are configured as a plurality of micro-protrusions. Accordingly, when the friction protrusions 31b and the counter-protrusions 50b are in contact with each other, frictional force therebetween increases and contact performance between the pressure members 50 and the support protrusions 31 increases.

That is, as the plurality of friction protrusions 31b provided at the outer circumferential surface of the support protrusion 31 and the plurality of counter-protrusions 50b provided at the inner end of the pressure member 50 are locked to each other, frictional force between the support protrusion 31 and the pressure member 50 may increase and the support protrusion 31 and the pressure member 50 may rotate integrally.

Hereinafter, operation of the above-described pumping device according to the present disclosure will be described. When the lever handle is manipulated for adjusting the height of the seat by the pumping device, the clutch cam 22 of the clutch drum 20 which is connected to the lever handle rotates. When the clutch cam 22 rotates, centering on each of the wedge protrusions 22a of the clutch cam 22, the clutch rollers 23 are pressed between the wedge protrusion 22a and the clutch drum 20. This causes the clutch rollers 23 to function as wedges between the clutch drum 20 and the clutch cam 22 so that the clutch drum 20 rotates together with the clutch cam 22.

Simultaneously, as each of the clutch rollers 23 rotates, each of the clutch springs 24 is compressed, and another clutch roller 23 connected to the clutch spring 24 rotates together and functions as a wedge between the clutch drum 20 and the clutch cam 22. After then, when the lever handle is released, the clutch roller 23 may be returned to an initial position by an elastic restoring force of the clutch springs 24.

After that, as shown in FIG. 7, as the clutch drum 20 rotates, the clutch protrusions 21 provided on the clutch drum 20 push the brake rollers 40, so that the brake drum 30 rotates. The pressure member 50 contacting with the support protrusion 31 is provided on the outer circumferential surface of the brake drum 30, the brake rollers 40 are arranged at both sides of the pressure member 50, and wedge surfaces 34 are provided at positions corresponding to the clutch protrusions 21 between the brake rollers 40 adjacent to each other. Whereby, when the clutch drum 20 rotates, as the clutch protrusions 21 push the brake rollers 40, the brake rollers 40 push the support protrusions 31 so that the brake drum 30 may rotate.

In other words, when the clutch drum 20 rotates by rotation of the clutch cam 22 with the clutch protrusion 21 of the clutch drum 20 inserted between the brake rollers 40, the brake rollers 40 press the support protrusions 31 together with the pressure members 50 as the clutch protrusions 21 push the brake rollers 40 so that the brake drum 30 may rotate together with the clutch drum 20. As described above, when the brake drum 30 rotates with the clutch drum 20, the output shaft 33 coupled to the brake drum 30 rotates with the brake drum 30, so that the height of the seat may be adjusted through a link device. The link device is a common technique in a seat device where the pumping device is applied, and the description of the linking structure thereof will be omitted.

When adjusting of the height of the seat is finished, as shown in FIG. 8, as the brake rollers 40 remain in a fitted state at the outer circumferential surface of the brake drum 30, even when an external force is reversely input through the output shaft 33, rotation of the brake drum 30 is prevented. Accordingly, even when an external force reversely input through the output shaft 33 acts on the pumping device in addition to the operating force through the lever bracket 10 and the clutch drum 20 in response to the manipulation of the lever handle, a position of the seat may be maintained by a brake function of the brake drum 30 since the brake rollers remain in the fitted state between the wedge surfaces 34 of the brake drum 30 and the housing 60.

The pumping device for a seat of a vehicle configured of the above-described structure has the plurality of pressure members 50 along the outer circumferential surface of the brake drum 30, and performs the brake operation through the pressure members 50 moved when the brake drum 30 rotates. Accordingly, friction between the brake drum 30 and the housing 60 can be avoided to prevent deterioration in operational performance. In addition, as the brake drum 30 has a simplified shape and the number of components is reduced, weight and size of the pumping device, and manufacturing cost can be reduced, and fuel efficiency can be increased.

What is claimed is:

1. A pumping device for a seat of a vehicle, the pumping device comprising:
    a clutch drum including a plurality of clutch protrusions spaced apart from each other along an edge of the clutch drum and configured to rotate in conjunction with rotation of a lever bracket;
    a brake drum including a plurality of support protrusions protruding outward along an outer circumferential surface of the brake drum while being spaced apart from the plurality of clutch protrusions, wherein the plurality of clutch protrusions are configured to be arranged at the outer circumferential surface of the brake drum;
    a plurality of brake rollers disposed between the plurality of clutch protrusions and the plurality of support protrusions; and
    a plurality of pressure members spaced apart from each other along the outer circumferential surface of the brake drum while being arranged in contact with the plurality of support protrusions,
    wherein when the brake drum is rotated, the plurality of pressure members are moved together with the plurality of support protrusions to be moved in conjunction with the plurality of brake rollers,
    wherein each of the plurality of support protrusions includes a locking protrusion protruding outward, and each of the plurality of pressure members includes an insertion groove, in which the locking protrusion is disposed, positioned at an inner end of each of the plurality of pressure members, the inner end contacting with the respective support protrusion.

2. The pumping device of claim 1, further comprising:
    a housing having a receiving space in which the clutch drum and the brake drum assembled with each other are disposed; and
    a cover coupled to the housing and configured for supporting the clutch drum and the brake drum disposed in the receiving space.

3. The pumping device of claim 2, wherein the brake drum includes a low- friction part located at a portion thereof, facing the cover, and the cover includes a low-friction counterpart located at a portion facing the brake drum and matching with the low-friction part.

4. The pumping device of claim 3, wherein either one of the low-friction part and the low-friction counterpart is configured to extend in a ring shape, and a remaining one of the low-friction part and the low-friction counterpart includes a plurality of parts that are spaced apart from each other along an extending direction of the ring shape.

5. The pumping device of claim 1, wherein the plurality of support protrusions are configured to extend along an edge of the brake drum between the plurality of brake rollers, and each of the plurality of pressure members is configured to extend in a bending shape along an extending direction of each of the plurality of support protrusions.

6. The pumping device of claim 1, wherein the inner end has a length shorter than a length of an opposite outer end thereof, and wherein the inner end contacts with the respective support protrusion.

7.
    A pumping device for a seat of a vehicle, the pumping device comprising:
    a clutch drum including a plurality of clutch protrusions spaced apart from each other along an edge of the clutch drum and configured to rotate in conjunction with rotation of a lever bracket;
    a brake drum including a plurality of support protrusions protruding outward along an outer circumferential surface of the brake drum while being spaced apart from the plurality of clutch protrusions, wherein the plurality of clutch protrusions are configured to be arranged at the outer circumferential surface of the brake drum;
    a plurality of brake rollers disposed between the plurality of clutch protrusions and the plurality of support protrusions; and
    a plurality of pressure members spaced apart from each other along the outer circumferential surface of the brake drum while being arranged in contact with the plurality of support protrusions, wherein when the brake drum is rotated, the plurality of pressure members are moved together with the plurality of support protrusions to be moved in conjunction with the plurality of brake rollers, wherein each of the plurality of support protrusions includes a plurality of friction protrusions at an outer circumferential surface thereof, and each of the plurality of pressure members includes a plurality of counter-protrusions, which are in contact with the plurality of friction protrusions, at an inner end of the respective pressure member which is in contact with the respective support protrusion.

* * * * *